United States Patent [19]

Hikmet

[11] Patent Number: 5,257,127
[45] Date of Patent: Oct. 26, 1993

[54] DEVICE FOR DOUBLING THE FREQUENCY OF A LIGHT WAVE USING A THREE DIMENSIONAL POLYMER NETWORK

[75] Inventor: Rifat A. M. Hikmet, Eindhoven, Netherlands

[73] Assignee: U.S. Philips Corp., New York, N.Y.

[21] Appl. No.: 837,518

[22] Filed: Feb. 18, 1992

[30] Foreign Application Priority Data

Feb. 26, 1991 [NL] Netherlands ............... 9100336

[51] Int. Cl.$^5$ .................................... H03F 7/00
[52] U.S. Cl. .......................... 359/328; 359/103; 359/332; 385/122
[58] Field of Search ........... 359/328, 332, 42, 103, 359/104, 106; 385/122, 129

[56] References Cited

U.S. PATENT DOCUMENTS

| | | | |
|---|---|---|---|
| 4,702,558 | 10/1987 | Coles et al. | 359/900 |
| 4,755,574 | 7/1988 | Choe | 526/258 |
| 4,886,339 | 12/1989 | Scozzafava et al. | 385/141 |
| 5,011,623 | 4/1991 | Yoshinaga et al. | 385/122 |
| 5,037,582 | 8/1991 | Miyata et al. | 385/122 |
| 5,097,016 | 3/1992 | Ishii et al. | 428/1 |

FOREIGN PATENT DOCUMENTS

| | | |
|---|---|---|
| 0338845 | 10/1989 | European Pat. Off. |
| 0351832 | 1/1990 | European Pat. Off. |
| 2632648 | 12/1989 | France |

*Primary Examiner*—Frank Gonzalez
*Attorney, Agent, or Firm*—William L. Botjer

[57] ABSTRACT

In a device for doubling the frequency of a light wave, a fundamental light wave 2 originating from a laser light source 1 is guided through a nonlinear optical medium 5 while forming a second harmonic wave 6. The nonlinear optical medium is formed from a polymer network and elements having a great hyperpolarizability. In the device, phase matching is realised by the application of a polymer network having a helical structure. The pitch of the helical structure is adapted to the phase-matching conditions by the selection of the polymerization conditions during the formation of the network.

6 Claims, 6 Drawing Sheets a b c d

DEVICE FOR DOUBLING THE FREQUENCY OF A LIGHT WAVE USING A THREE DIMENSIONAL POLYMER NETWORK

BACKGROUND OF THE INVENTION

The invention relates to a device for doubling the frequency of a light wave, in which device a fundamental light wave is guided through a nonlinear optical medium while forming a second harmonic wave, said nonlinear optical medium being formed from a polymer network and elements having a great hyperpolarizability.

The device according to the invention can be used, for example, in combination with a semiconductor laser light source generating red light, as a compact blue light source for optical storage of information and for telecommunication and laser printers. By virtue of the use of shortwave light, the information density can be increased and the possibilities of writing and erasing information are extended as a result of the larger photon energy.

In U.S. Pat. No. 4,886,339 a description is given of such a device for doubling the frequency of a light wave, said device comprising a nonlinear optical medium consisting of non-centrosymmetric molecular dipoles which are polarly oriented in a polymer network. The molecular dipoles exhibit a great hyperpolarizability. The use of a polymer network has the advantage that the chiral structure of the medium and the orientation of the hyperpolarizable elements can be fixed permanently, polymer networks being less sensitive to changes in temperature than the often used linear polymers having hyperpolarizable molecule groups in side chains.

In devices for doubling the frequency of a light wave the problem arises that the nonlinear optical medium has different refractive indices for the fundamental wave and the second harmonic wave, thus bringing about increasing phase differences between both waves when light is guided through the medium. Owing to destructive interference, a large part of the intensity of the generated blue light is lost. A possible solution to this problem is the use of materials having an anomalous dispersion or the use of birefringent material, the ordinary refractive index of which materials at one wavelength should be equal to the extraordinary refractive index at the other wavelength. Another solution which is known per se is the use of waveguides having spatially periodic structures. In the latter solution, the nonlinear optical properties in alternate regions are selected such that in regions where the fundamental light wave and the second harmonic wave are out of phase, the second harmonic wave is generated to a reduced degree or not at all, so that no complete extinction takes place. It is even possible to change the nonlinear optical properties in such regions in a manner such that the generated blue light is of the opposite phase (domain inversion), so that a further intensification of the blue light takes place.

In PCT Patent Application WO 90/04807 a description is given of such a (domain inversion) device in which domains of opposite ferroelectric polarity are manufactured under a mask layer in an inorganic nonlinear optical material by means of annealing. Due to its destructive character, said method is less suitable for use with polymer materials.

SUMMARY OF THE INVENTION

It is an object of the invention to provide, inter alia, a possibility of realising phase matching in organic nonlinear optical materials, in particular in polymer networks. A further object of the invention is to provide nonlinear optical materials for frequency-doubling of light originating from a semiconductor laser light source, which materials have to be resistant and insensitive to variations in temperature. A still further object of the invention is to provide nonlinear optical materials in which the hyperpolarizable elements are permanently oriented, the orientation being obtained without damaging the helical structure.

According to the invention, these objects are achieved by a device as described in the opening paragraph, in which the polymer network consists of a liquid crystalline material having a helical structure, the refractive indices and the pitch of the helical structure being adjusted such that phase matching takes place.

In a suitable embodiment of the device according to the invention, the polymer network consists of chiral nematic material, also termed cholesteric material. Particularly suitable polymer networks can be manufactured from polyacrylate or polymethacrylate compounds having liquid crystalline properties, to which compounds chiral molecules are added. It is also possible to use polymer networks in which chiral molecular groups form a part of the network.

In an alternative embodiment of the device according to the invention, the polymer network consists of chiral smectic material. Such materials are ferroelectric and have permanent dipoles, as a result of which a suitable orientation of the hyperpolarizable elements can be obtained in a simpler manner.

The hyperpolarizable elements may be present in the network in the form of small particles or molecules. To obtain a particularly stable nonlinear optical medium, efficaciously, the elements having a great hyperpolarizability form part of the polymer network.

A very effective device for doubling the frequency of a light wave is obtained by providing said device with a $\lambda/4$ element for circularly polarizing the fundamental light wave.

The theoretical background of phase matching in a medium having optical rotation, such as in a liquid crystalline material having a helical structure, is described by H. Rabin and P. P. Bey in Physical Review 156 (3), on pages 1010 to 1016 (1967); the optical rotation can be calculated according to an article by Hl. de Vries in Acta Crystalllographica 4, on pages 219 to 226 (1951). The phase matching distance is derived in known manner from the refractive indices at the wavelengths (red and blue light) used, after which the pitch is selected such that an optical rotation of 180° takes place over the coherence length, the second harmonic wave being subject to a phase shift of $\pi$ to preclude destructive interference.

BRIEF DESCRIPTION OF THE DRAWING

The invention will be explained in greater detail by means of an exemplary embodiment and with reference to the accompanying drawing, in which FIG. 5 shows suitable monomers for the formation of a polymer network, in which

DESCRIPTION OF THE PREFERRED EMBODIMENT

Exemplary embodiment

Figure 1:
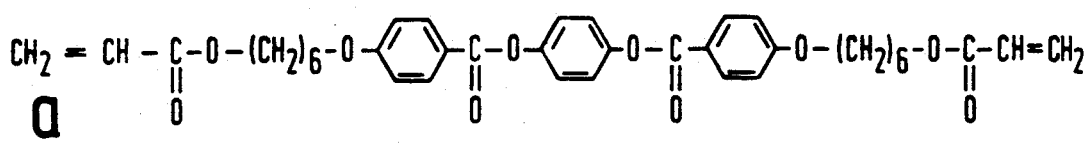
FIG. 1 shows the constituents of a nonlinear optical medium according to an embodiment of the device in accordance with the invention.
Figure 1:
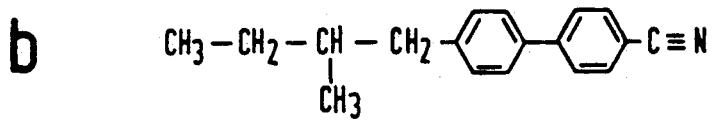
Figure 1:
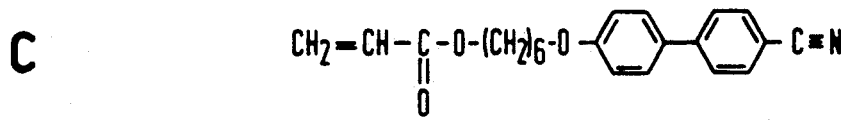
Figure 1:
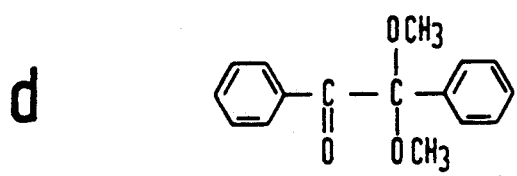
Figure 10:
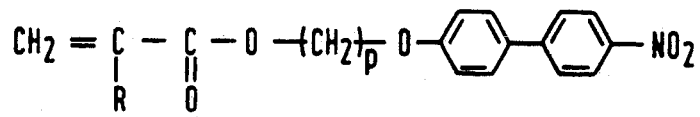
FIG. 10 shows suitable hyperpolarizable compounds for incorporation in a polymer network.
Figure 10:
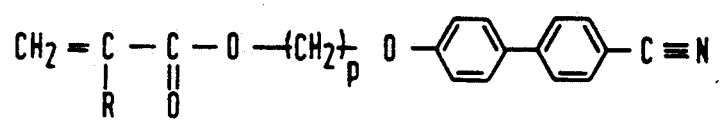
Figure 10:
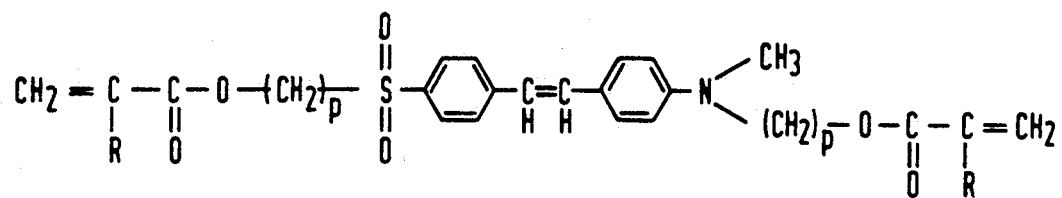
Figure 10:
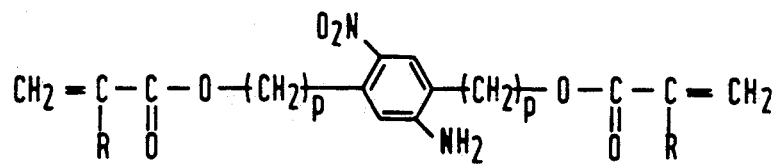
Figure 10:
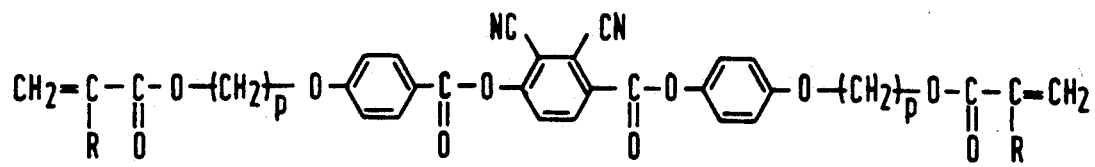

A mixture of liquid crystalline materials was prepared comprising 70 wt. % of a monomer diacrylate of the composition given in FIG. 1a, 19 wt. % of the chiral compound of the composition given in FIG. 1b, 10 wt. % of the strongly hyperpolarizable compound having the composition given in FIG. 1c, and 1 wt. % of the light-sensitive initiator having the composition given in FIG. 1d.

Figure 2:
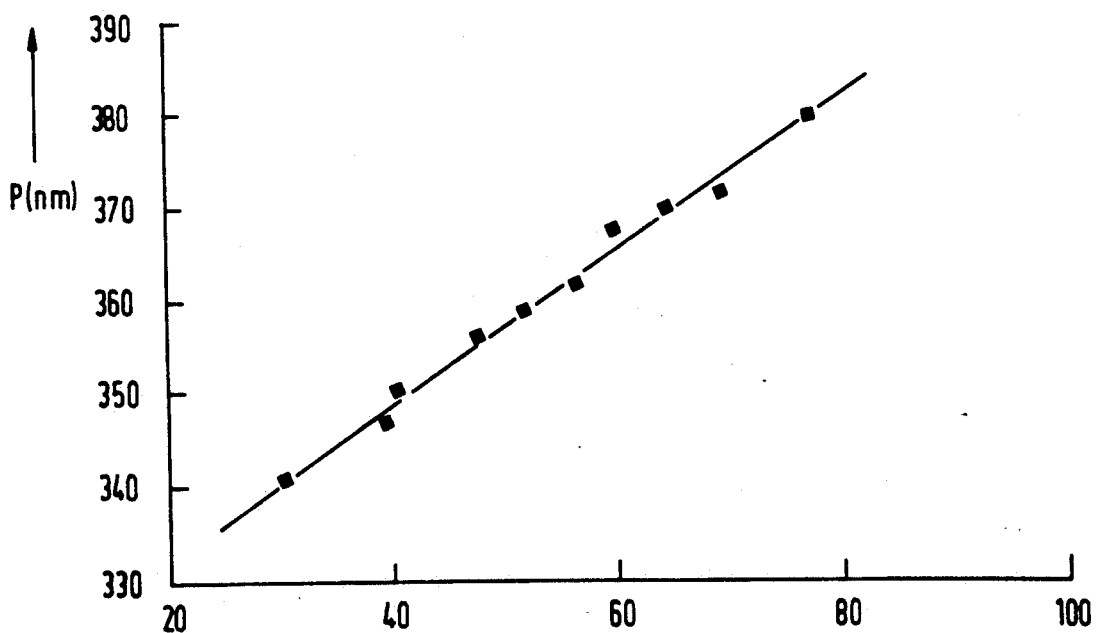
FIG. 2 shows the pitch of a helical structure as a function of the temperature.

In such a mixture the molecules are arranged according to a helical structure, the pitch P of which is plotted as a function of the temperature T in FIG. 2. A polymer network in which the pitch and other (optical) properties are fixed is formed by curing the mixture at a suitable temperature by means of radiation with UV light for several minutes.

Figure 3A:
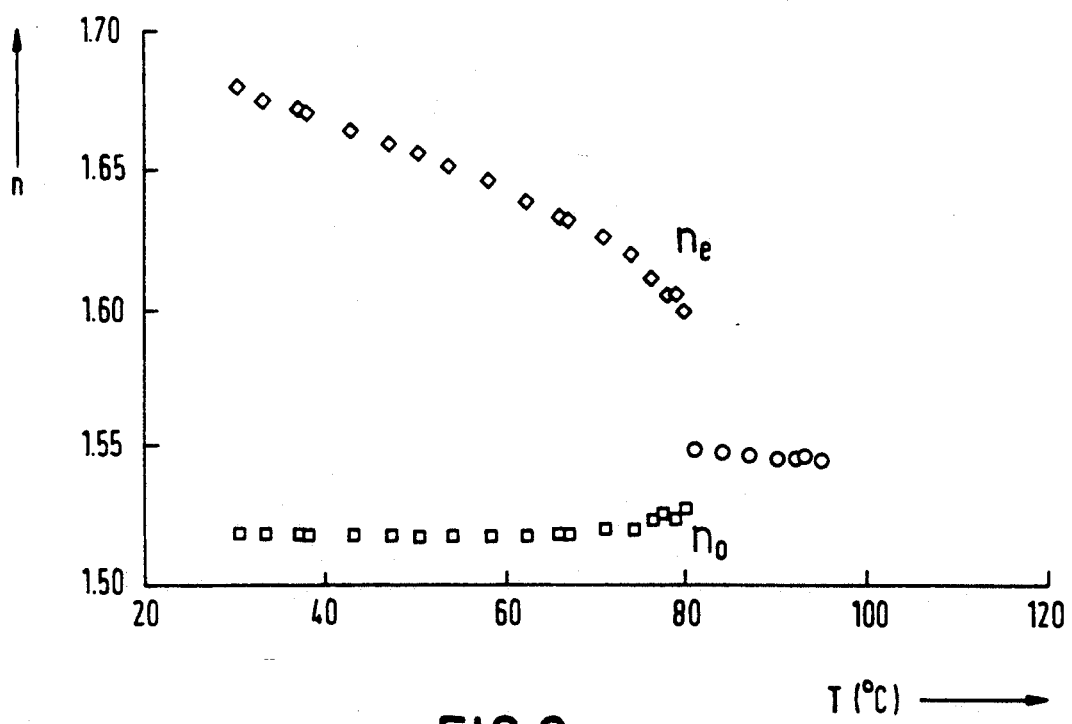
FIGS. 3a and 3b show the refractive indices of liquid crystalline materials, before (a) and after (b) the formation of a polymer network, respectively FIG. 4 diagrammatically shows a device according to the invention.
Figure 3B:
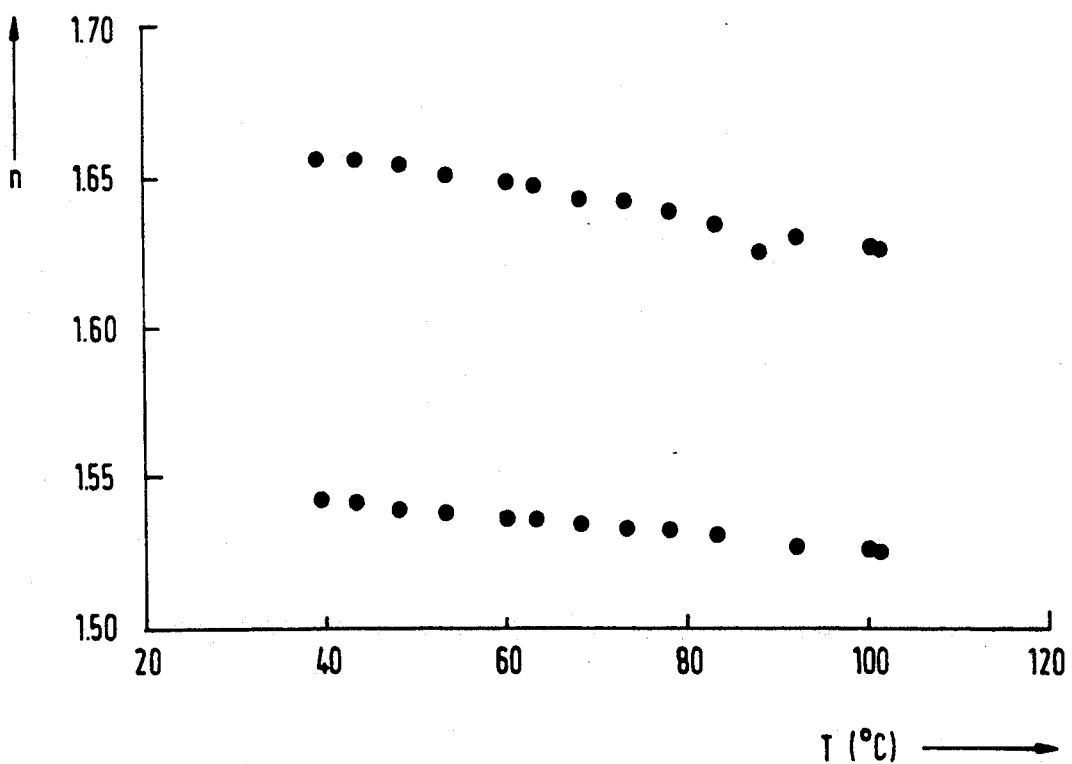

FIG. 3a shows the extraordinary refractive index $n_e$ and the ordinary refractive index $n_o$, as a function of the temperature T, of the mixture before curing. At temperatures above approximately 80° C., the mixture loses its birefringent properties. The refractive indices after curing are given in FIG. 3b which shows that the temperature dependence has decreased as a result of the formation of the network.

Figure 4:
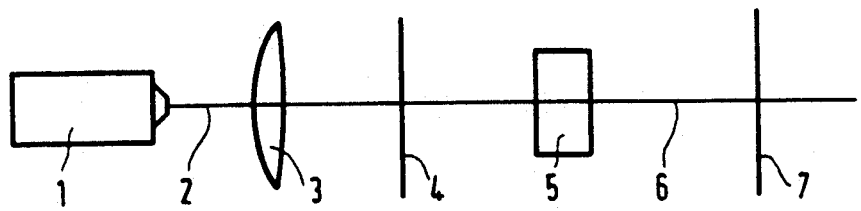

FIG. 4 diagrammatically shows a device according to the invention, comprising a laser light source 1, for example a semiconductor laser light source such as a GaAs laser or an AlGaAs laser, by which a linearly polarized fundamental light wave 2 was generated (red light). A lens 3 was used to focus the light wave on a nonlinear optical medium 5 which comprises a layer of the cured material of the aforementioned composition between two glass plates. A λ/4 element 4 by means of which the fundamental light wave 2 was circularly polarized was present between the lens 3 and the nonlinear optical medium 5. The outgoing light ray 6 contained a quantity of light, for example blue light, the frequency of which had double relative to the ingoing light ray. If desired, the red light can be obstructed at the location of the outgoing light ray 6 by means of a colour filter 7.

Figure 5:
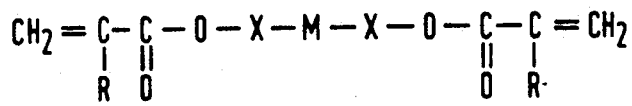
Figure 5:
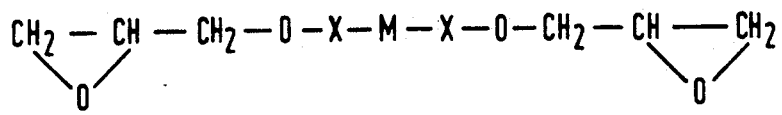
Figure 5:
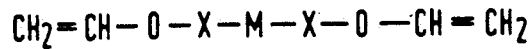
Figure 5:
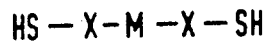
Figure 5:
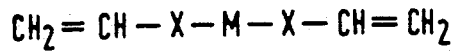
Figure 6:
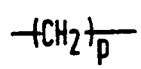
FIG. 6 shows examples of the group X.
Figure 6:
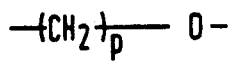
Figure 6:
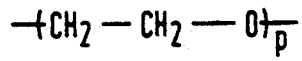
Figure 6:
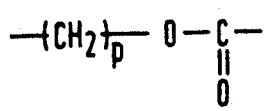
Figure 6:
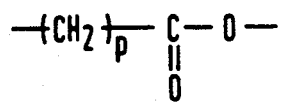
Figure 6:
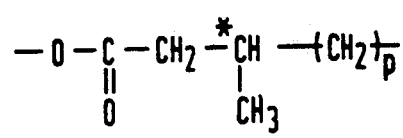
Figure 6:
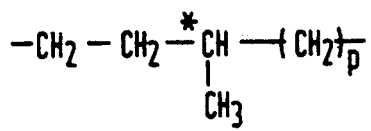
Figure 7:
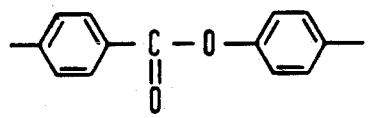
FIG. 7 shows examples of the group M.
Figure 7:
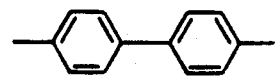
Figure 7:
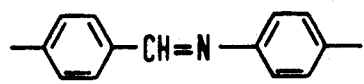
Figure 7:
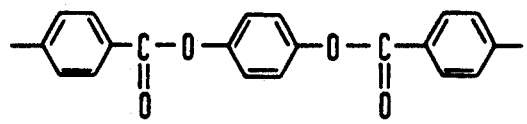

FIG. 5 shows a number of alternative, suitable monomers which can be used to manufacture polymer networks for use in a device according to the invention. In the formulae, —R denotes a hydrogen atom or a methyl group. FIG. 6 shows examples of the group —X— wherein p may have a value of 1 to approximately 12. As indicated in the Figure, it is possible, if desired, to use chiral molecular groups —X—. Examples of the group —M— are shown in FIG. 7. The selection of a suitable light-sensitive initiator can be adapted in known manner to the properties of the monomer. Aromatic carbonyl compounds are light-sensitive initiators which can be suitably used to form a network of di(meth)acrylate compounds; to form a network of epoxy and vinyl ether compounds, use can be made of diaryl iodonium compounds such as diphenyl iodonium hexafluoroarsenide.

Figure 8:
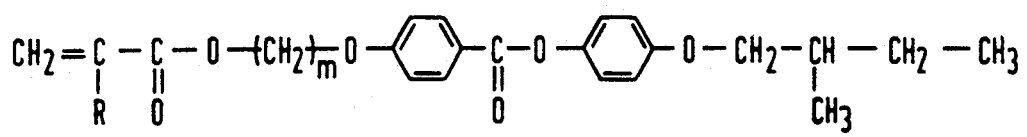
FIG. 8 shows suitable chiral compounds for incorporation in a polymer network.
Figure 8:
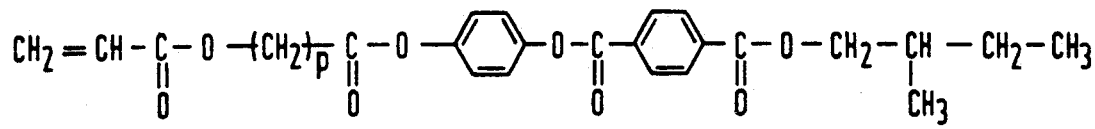
Figure 8:
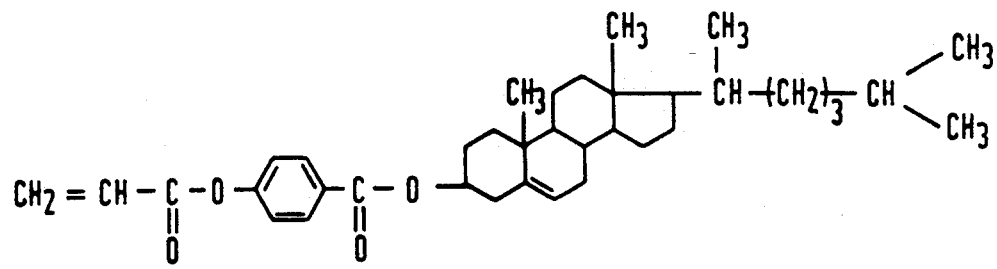
Figure 8:
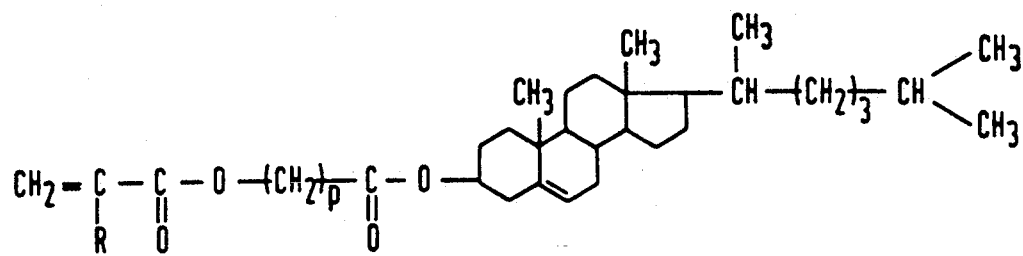

FIG. 8 shows a number of chiral compounds which can bring about a helical structure in a polymer network and which can also be suitably incorporated into the network by means of copolymerization. In the formulae, m has a value of 2 to approximately 15 and p has a value of 1 to approximately 12.

Figure 9:
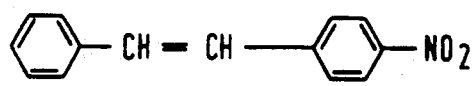
FIG. 9 shows suitable hyperpolarizable compounds.
Figure 9:
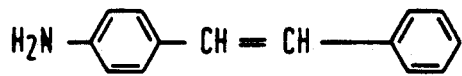
Figure 9:
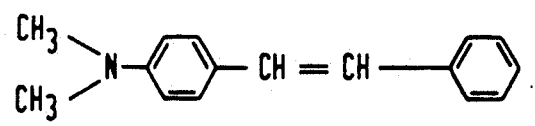
Figure 9:
Figure 9:
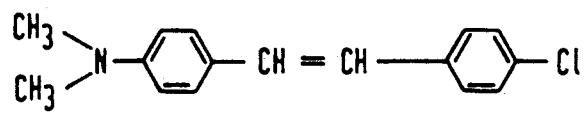
Figure 9:
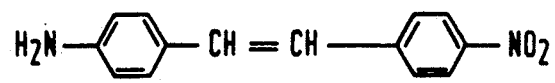
Figure 9:
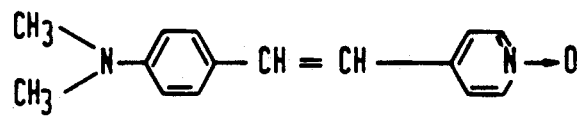

FIG. 9 shows a number of suitable compounds having a great hyperpolarizability, which compounds can be used in a nonlinear optical medium in a device according to the invention. FIG. 10 shows similar compounds which can also suitably be incorporated into the network by means of copolymerization. In the formulae, —R denotes a hydrogen atom or a methyl group and p has a value of 1 to approximately 12.

In the device according to the invention, the use of a polymer network having a helical structure enables phase-matching conditions to be realised in a simple manner by adapting the pitch of the helical structure, and also the refractive indices and the double refraction can be changed according to the requirements. Besides applications for doubling the frequency of a light wave, such a device can also be used for generating a third harmonic wave, see the above-mentioned article by H. Rabin and P. P. Bey.

I claim:

1. A device for doubling the frequency of a light wave, in which device a fundamental light wave is guided through a nonlinear optical medium while forming a second harmoic wave, comprising said nonlinear optical medium being formed from a three dimensional polymer network and elements having a great hyperpolarizability, the polymer network having a liquid crystalline material with a helical structure, the refractive indices and the pitch of the helical structure being adjusted such that phase matching takes place.

2. A device as claimed in claim 1, wherein the polymer network consists of chiral nematic material.

3. A device as claimed in claim 2, wherein the chiral nematic material consists of a polyacrylate or polymethacrylate compound having liquid crystalline properties, to which compound chiral molecules are added.

4. A device as claimed in claim 1, wherein the polymer network consists of chiral smectic material.

5. A device as claimed in one of the claims 1 up to and including 4, wherein the elements having a great hyperpolarizability form part of the polymer network.

6. A device as claimed in claim 1, further including a λ/4 element for circularly polarizing the fundamental light wave.

* * * * *